(12) United States Patent
Sugimoto

(10) Patent No.: US 10,514,493 B2
(45) Date of Patent: *Dec. 24, 2019

(54) DISPLAY DEVICE

(71) Applicant: SAKAI DISPLAY PRODUCTS CORPORATION, Sakai-shi, Osaka (JP)

(72) Inventor: Arimasa Sugimoto, Sakai (JP)

(73) Assignee: SAKAI DISPLAY PRODUCTS CORPORATION, Sakai-shi, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/089,358

(22) PCT Filed: Mar. 29, 2016

(86) PCT No.: PCT/JP2016/060254
§ 371 (c)(1),
(2) Date: Sep. 27, 2018

(87) PCT Pub. No.: WO2017/168595
PCT Pub. Date: Oct. 5, 2017

(65) Prior Publication Data
US 2019/0121017 A1  Apr. 25, 2019

(51) Int. Cl.
*F21V 8/00* (2006.01)
*G02F 1/1335* (2006.01)
(Continued)

(52) U.S. Cl.
CPC ..... *G02B 6/0088* (2013.01); *G02F 1/133608* (2013.01); *G02F 1/133611* (2013.01);
(Continued)

(58) Field of Classification Search
CPC ..... G02B 6/008; G02F 1/1333; G02F 1/1335; G09F 9/35
See application file for complete search history.

(56) References Cited

U.S. PATENT DOCUMENTS

2006/0147175 A1* 7/2006 Shinohara ............ G02B 6/0088
385/146
2014/0009697 A1* 1/2014 Kuromizu ............ G02B 6/0088
348/790
(Continued)

FOREIGN PATENT DOCUMENTS

JP  2005-292729 A  10/2005
JP  2006-190521 A   7/2006
(Continued)

*Primary Examiner* — Mary Ellen Bowman
(74) *Attorney, Agent, or Firm* — ScienBiziP, P.C.

(57) ABSTRACT

Provided is a display device that can prevent light emitted from, a light guide plate from arriving at a display panel via a gap in an optical sheet and a gap between the optical sheet and a holding frame member. The display device is provided with: a light guide plate having a light exit surface; an optical sheet that is arranged facing the light exit surface, that is configured from a plurality of stacked unit sheets, and in which a plurality of flanges are arranged in each of the unit sheets so as to extend along the sheet surface of the unit sheet from the side edge of the unit sheet toward the exterior; and a holding frame member having formed therein a plurality of accommodating sections in which the flanges of the optical sheet are accommodated when holding the optical sheet. One or more of the plurality of flanges in each of the unit sheets is a matching flange having a shape that matches the shape of the accommodating section along the sheet surface. In this way, the accommodating section blocks light from the light guide plate by accommodating one or more of the matching flanges.

4 Claims, 10 Drawing Sheets

(51) Int. Cl.
*G09F 9/35* (2006.01)
*G02F 1/1333* (2006.01)

(52) U.S. Cl.
CPC .......... *G02F 2001/133317* (2013.01); *G02F 2201/54* (2013.01); *G09F 9/35* (2013.01)

(56) References Cited

U.S. PATENT DOCUMENTS

| | | | | |
|---|---|---|---|---|
| 2014/0211124 | A1* | 7/2014 | Huang | G02B 6/0088 |
| | | | | 349/65 |
| 2015/0338573 | A1* | 11/2015 | Kao | G02B 6/0088 |
| | | | | 362/611 |
| 2018/0299722 | A1* | 10/2018 | Ohtsubo | G02F 1/133308 |
| 2019/0041571 | A1* | 2/2019 | Sugimoto | G02F 1/133308 |
| 2019/0079350 | A1* | 3/2019 | Chen | G02F 1/133608 |

FOREIGN PATENT DOCUMENTS

| | | |
|---|---|---|
| JP | 2011-175055 A | 9/2011 |
| JP | 2013-037974 A | 2/2013 |
| WO | 2015/037404 A1 | 3/2015 |

\* cited by examiner

FIG.8
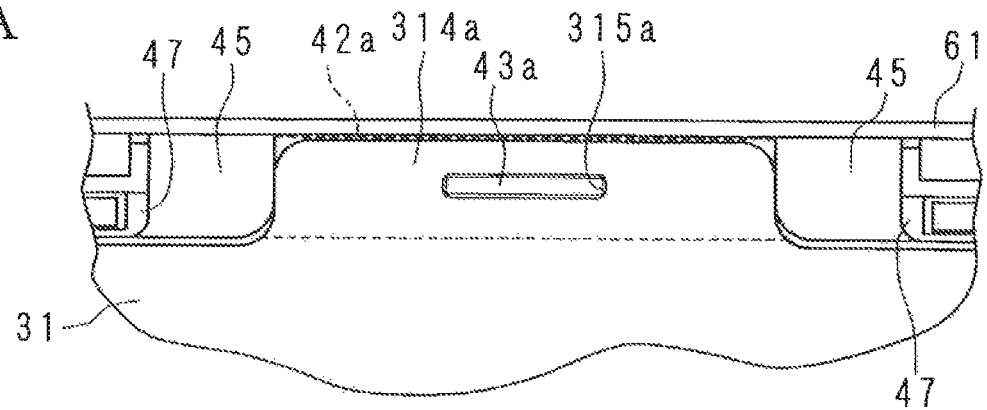
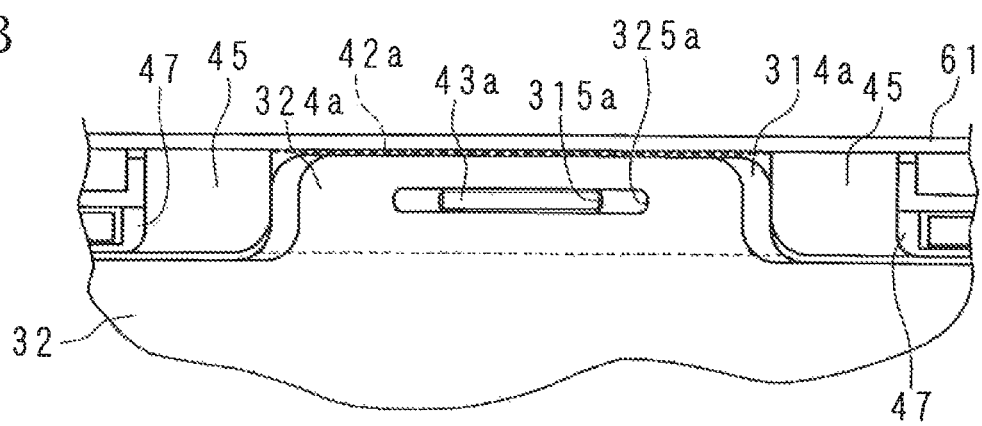
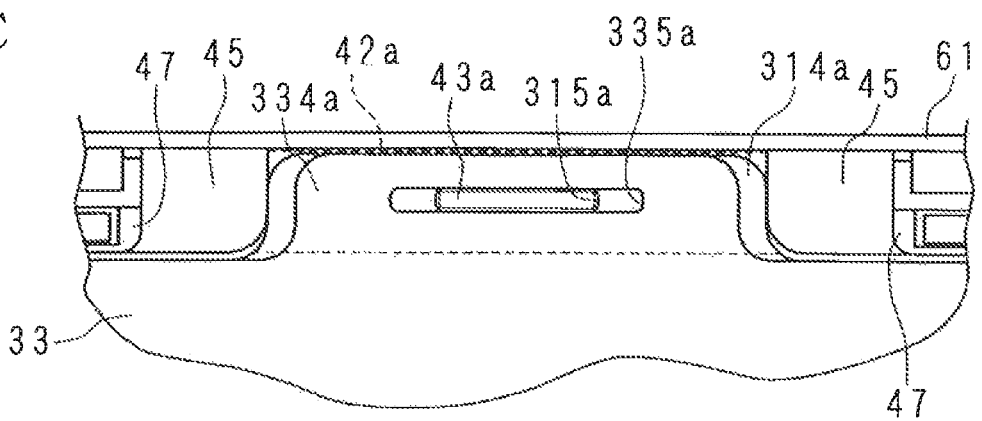

FIG.9
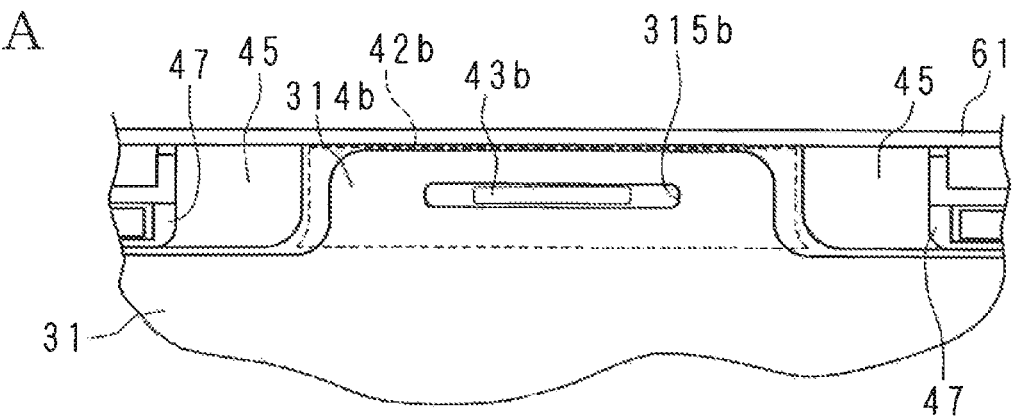
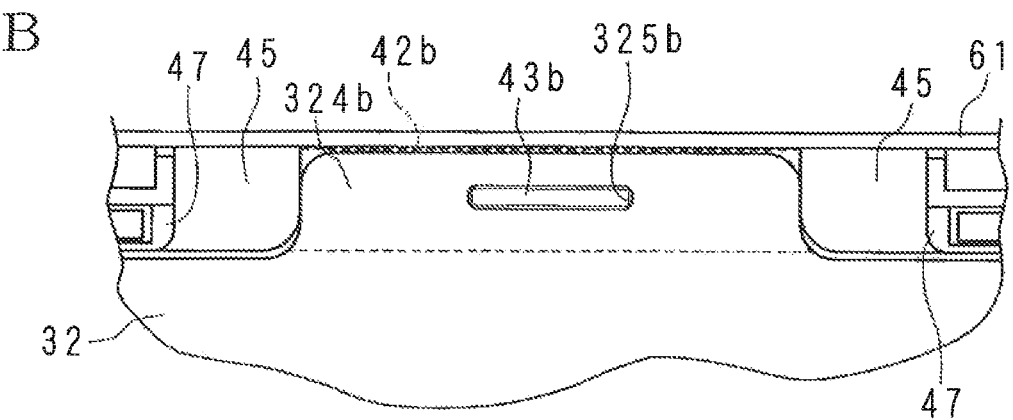
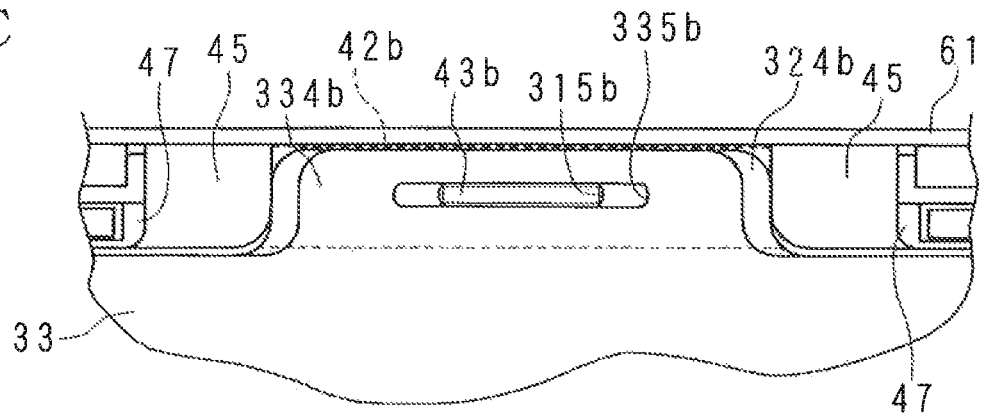

FIG.10
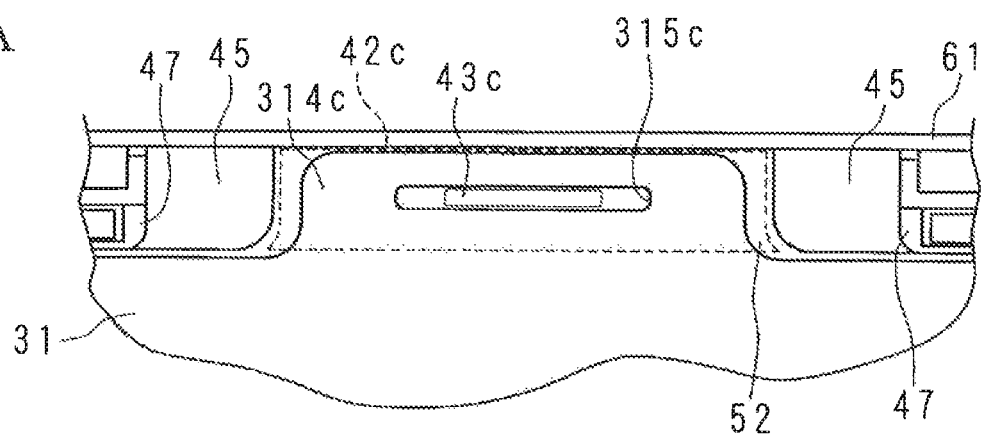
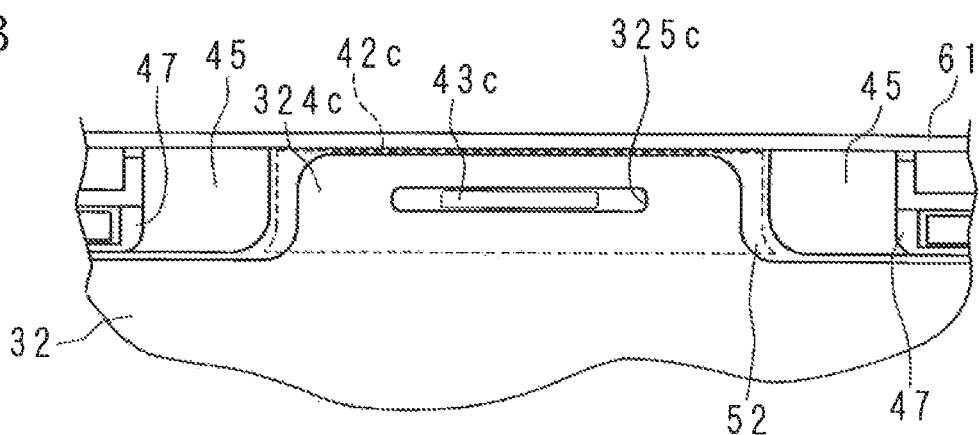
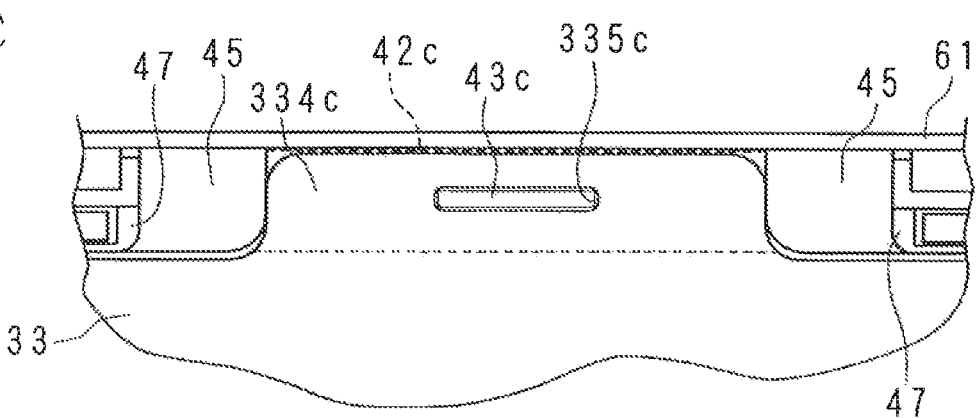

DISPLAY DEVICE

TECHNICAL FIELD

The present invention relates to a display apparatus including a light guide plate and an optical sheet that includes a plurality of unit sheets provided in a stacked manner.

BACKGROUND ART

Recently, so-called thin display apparatuses including a liquid crystal display panel are in a wide use. For such a thio display apparatus, various modifications have been made to decrease the width of a frame outside a display screen.

For example, Patent Document No. 1 discloses the following display apparatus. This display apparatus is configured such that an optical sheet is positioned by a panel support portion that supports a display panel. In this manner, light entering the display panel after being transmitted through the optical sheet does not easily become uneven, and there is no need to separately provide another portion to support the display panel in addition to the portion positioning the optical sheet. Thus, the width of the frame is further decreased.

CITATION LIST

Patent Literature

Patent Document No. 1: WO2015/037404

SUMMARY OF INVENTION

Technical Problem

In a display apparatus having a structure that uses a panel support portion as described above, the panel support portion is provided between a light guide plate and an optical sheet, and supports peripheral edges of the light guide plate and the optical sheet. Therefore, light directed from the light guide plate does not reach the display panel after passing through a gap between the optical sheet and the panel support portion.

In the meantime, there are many structures in which the panel support portion is not provided between the light guide plate and the optical sheet in order to decrease the thickness. In such a structure, the light guide plate and the optical sheet contact each other, and light may undesirably leak through the gap between the optical sheet and the panel support portion. Such light leakage may cause luminance unevenness or the like to the display panel. However, this problem is not considered for the display apparatus disclosed in Patent Document No. 1.

The present invention made in light of such a situation has an object of providing a display apparatus including a light guide plate and an optical sheet that includes a plurality of unit sheets provided in a stacked manner and prevents light, directed from the light guide plate, from reaching the display panel after passing through a gap between the optical sheet and the holding frame member.

Solution to Problem

A display apparatus in an embodiment according to the present invention includes a light guide plate having a light output surface; an optical sheet including a plurality of unit sheets provided in a stacked manner, the plurality of unit sheets each including a plurality of flanges extending outward from a side edge of the unit sheet along a sheet plane of the unit sheet, the optical sheet facing the light output surface; and a holding frame member including a plurality of accommodation portions formed therein, the plurality of accommodation portions accommodating the flanges included in the optical sheet in a state where the holding frame member holds the optical sheet. At least one of the plurality of flanges of each of the plurality of unit sheets is a matching flange having a shape matched to a shape of the corresponding accommodation portion along the sheet plane. In each of the accommodation portions, at least one of the matching portions included in the optical sheet is accommodated.

Advantageous Effects of Invention

The present invention prevents light, directed from the light guide plate, from reaching a display panel after passing through a gap between the optical sheet and the holding frame member, and as a result, prevents luminance unevenness or the like in an image displayed by a display apparatus.

BRIEF DESCRIPTION OF DRAWINGS

FIG. 8 provides views illustrating the relationship between an accommodation portion and engageable flanges in the liquid crystal TV receiver in embodiment 1.

FIG. 9 provides views illustrating the relationship between an accommodation portion and engageable flanges in the liquid crystal TV receiver in embodiment 1.

FIG. 10 provides views illustrating the relationship between an accommodation portion and engageable flanges in the liquid crystal TV receiver in embodiment 1.

DESCRIPTION OF EMBODIMENTS

Hereinafter, a display apparatus in an embodiment according to the present invention will be described in detail with reference to the drawings by way of an example in which the display apparatus is applied to a so-called liquid crystal TV receiver including a liquid crystal panel.

Embodiment 1

Figure 1:
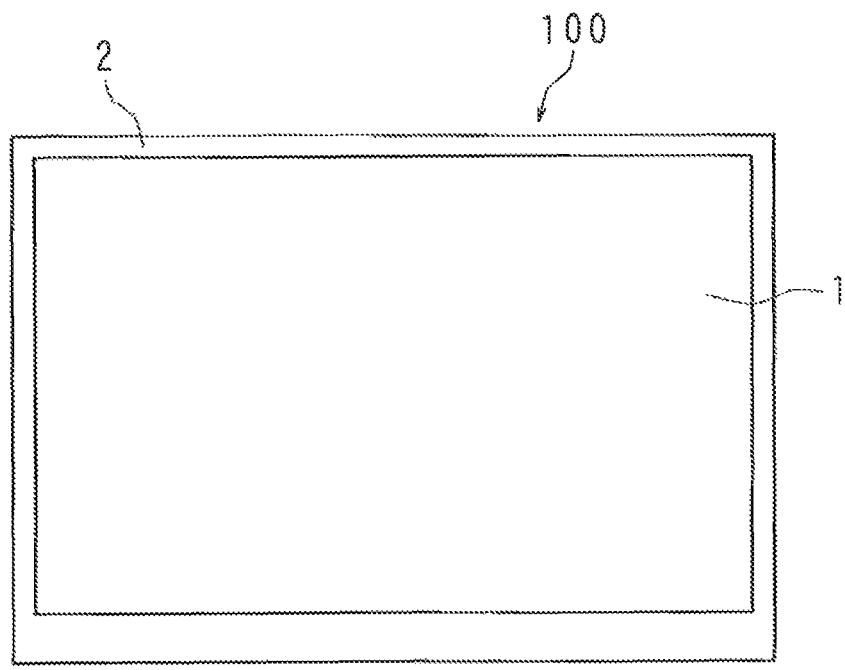
FIG. 1 is a front view showing an external appearance of a liquid crystal TV receiver in embodiment 1.

FIG. 1 is a front view showing an external appearance of a liquid crystal TV receiver 100 in embodiment 1. In the liquid crystal TV receiver 100, a liquid crystal display panel 1 and other components are accommodated in a bezel 2 and a backlight chassis 6 described below.

Figure 2:
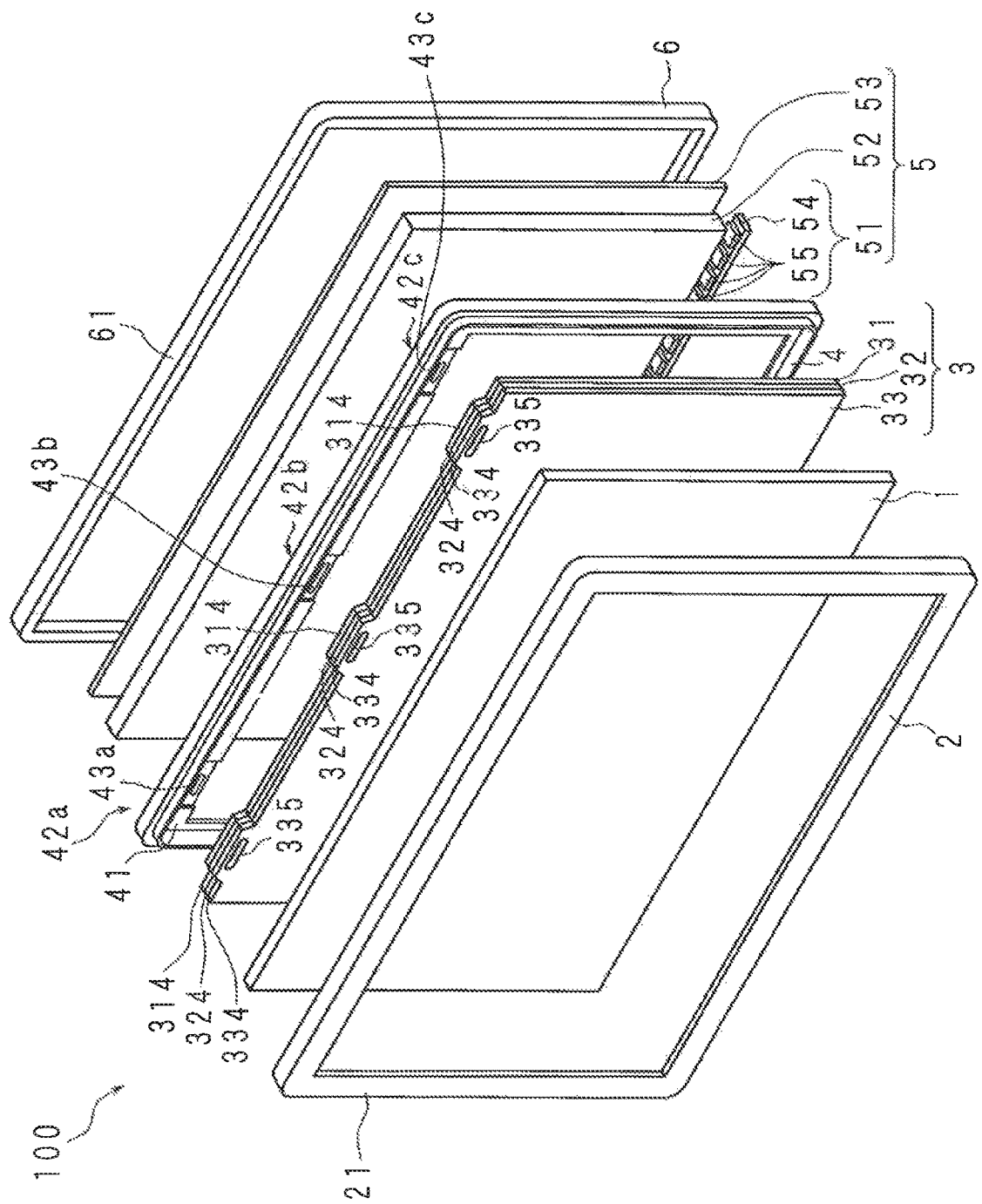
FIG. 2 is an exploded perspective view schematically showing main parts constituting the liquid crystal TV receiver in embodiment 1.

FIG. 2 is an exploded perspective view schematically showing main parts constituting the liquid crystal TV receiver 100 in embodiment 1.

As shown in FIG. 1, the liquid crystal TV receiver 100 in this embodiment includes the liquid crystal display panel 1, which is rectangular, in a front portion thereof. The liquid crystal display panel 1 displays images (encompassing video sequences) on a front surface as one surface (image displaying surface). As shown in FIG. 2, an optical sheet 3, a holding frame member 4 holding the optical sheet 3, a light source device 5 and the backlight chassis 6 are provided in this order to the rear of the liquid crystal display panel 1. The light source device 5 is an edge-lit light source device including a light source 51, a light guide plate 52 and a reflective sheet 53.

In this specification, the term "front", which is used as a term representing a position of a component in terms of direction, refers to a region closer to the surface of the liquid crystal TV receiver 100 which displays images, and similarly, the term "rear" refers to a region farther therefrom. The light guide plate 52 includes a light output surface, which is at a front surface thereof and from which light is directed, a back surface, which is a rear surface of the light guide plate 52, and end surfaces, which are perpendicular to the light output surface and the back surface. In the light source device 5, the light source 51 is located such that an optical axis is directed toward a light input surface, which is one of the end surfaces of the light guide plate 52. Light entering into the light guide plate 52 from the light input surface thereof is directed toward the liquid crystal display panel 1 from the light output surface of the light guide plate 52. The reflective sheet 53 is attached to the back surface of the light guide plate 52 in order to return light leaking from the back surface back to the light guide plate 52.

The light source device 5 is accommodated in the backlight chassis 6, which has a shape of a cuboid box with a front side open. Peripheral edges of the optical sheet 3 and side walls of the backlight chassis 6 are surrounded by the bezel 2, which is rectangular frame-shaped.

In the liquid crystal receiver 100 in this embodiment, light directed from the light guide plate 52 is received by the liquid crystal display panel 1 after being transmitted through the optical sheet 3. In this manner, the optical sheet 3 includes a light receiving surface facing the light output surface of the light guide plate 52 and a light directing surface opposite to the light receiving surface.

In this specification, a surface indispensable for a function of a specific component will be referred to as a "main surface". Also, two surfaces opposite to each other in the same component will be referred to also as "one surface and the other surface". Namely, one surface (light directing surface) of the optical sheet 3 is arranged to face the other surface (light input surface) of the liquid crystal display panel 1, and one surface (light output surface) of the light guide plate 52 is arranged to face the other surface (light receiving surface) of the optical sheet 3. One surface (reflective surface) of the reflective sheet 53 is arranged to face the other surface (back surface) of the light guide plate 52.

In this specification, a "sheet" is a thin structural body including two sheet surfaces opposite to each other (light receiving surface and light directing surface) acting as main surfaces. These main surfaces are coupled with each other by end surfaces perpendicular to the two main surfaces. In this specification, such an end surface of the sheet will also be referred to as an "end side of the sheet" with no consideration of the thickness of the sheet.

In this embodiment, the light output surface of die light guide plate 52 may be in contact with the light receiving surface of the optical sheet 3, and the back surface of the light guide plate 52 may be in contact with the reflective sheet 53.

The bezel 2 is a hollow rectangular frame. The bezel 2 includes a tubular side plate defining a rectangular opening and a loop-shaped frame portion 21 extending from an end of the opening of the side plate toward the center of the opening. The bezel 2 has an L-shaped cross section in a thickness direction (front-rear direction) of the liquid crystal TV receiver 100. The frame portion 21 of the bezel 2 is located in front of the liquid crystal display panel 1. In other words, a peripheral edge of the one surface of the liquid crystal display panel 1 is covered with the frame portion 21 of the bezel 2. In this manner, the image displaying surface of the liquid crystal display panel 1 has a structure in which a display region exposed from the opening of the frame is surrounded by a peripheral region covered with the frame portion 21. Therefore, a user may visually recognize an image displayed on the display region not covered with the frame portion 21 on the one surface of the liquid crystal display panel 1.

The liquid crystal display panel 1 has a rectangular flat-plate shape. The liquid crystal display panel 1 adopts, for example, an active matrix system. The liquid crystal display panel 1 includes a polarizer (not shown) on the other surface thereof. The liquid crystal display panel 1 is configured to use the polarizer to divide light entering into the liquid crystal display panel 1 into a P wave (horizontally polarized component) and an S wave (vertically polarized component) such that only the P wave is transmitted through the polarizer and propagates toward the liquid crystal display panel 1 while the S wave is absorbed by the polarizer. The liquid crystal display panel 1 may be, for example, an electrophoretic liquid crystal panel.

The optical sheet 3 provided to the rear of the liquid crystal display panel 1 is a known component that directs light, which is received from the light source 51 via the light guide plate 52, toward the liquid crystal display panel 1 as more uniform light.

Figure 3:
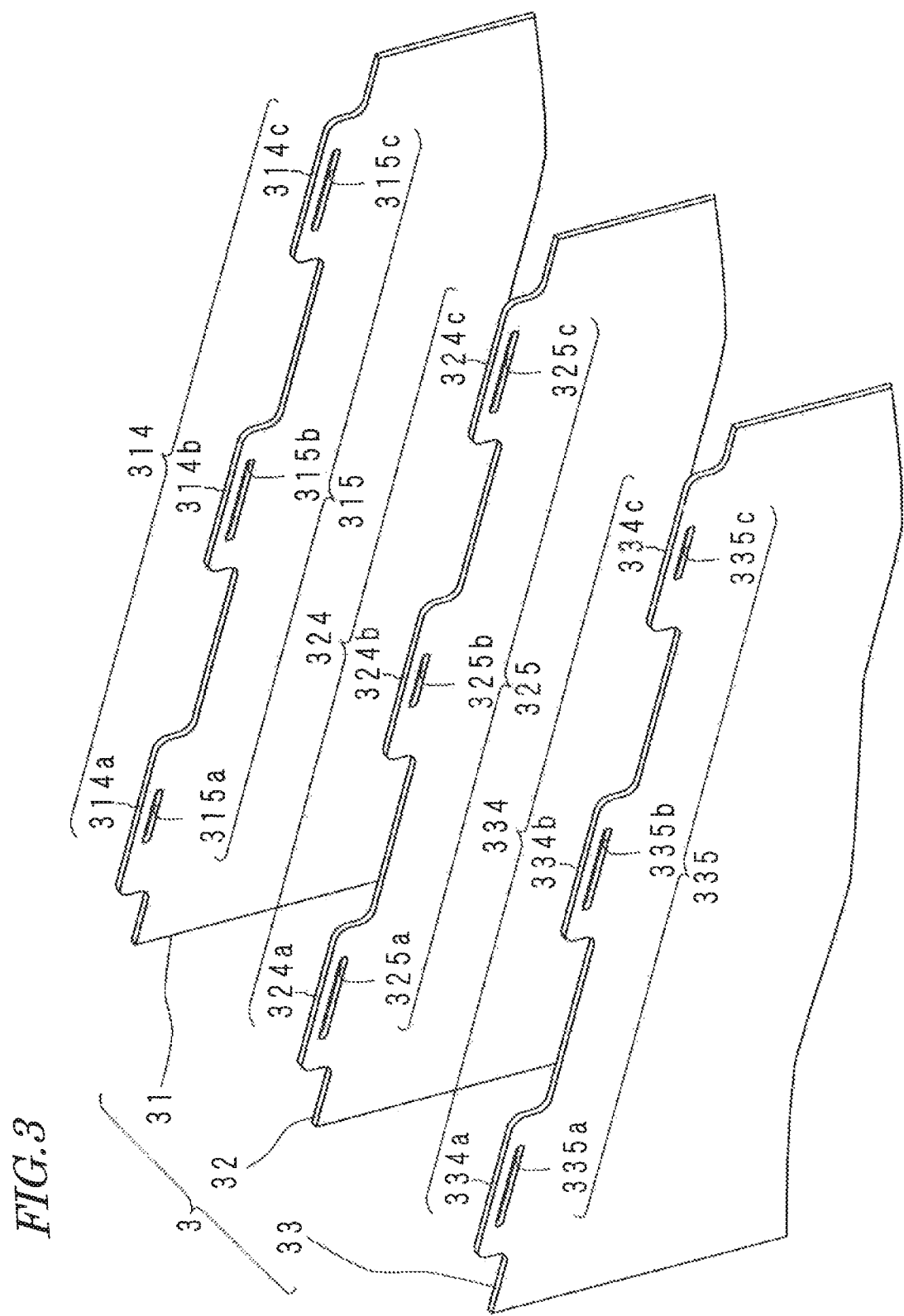
FIG. 3 is a perspective view showing a part of an optical sheet in the liquid crystal TV receiver in embodiment 1.

FIG. 3 is a perspective view showing a part of the optical sheet 3 in the liquid crystal TV receiver 100 in embodiment 1. The optical sheet 3 includes, for example, three unit sheets 31, 32 and 33 stacked each other. In more detail, the unit sheets 31 and 33 are diffusion sheets, and the unit sheet 32 is a prism sheet. The unit sheet 32 is sandwiched between the unit sheets 31 and 33. The unit sheets 31, 32 and 33 have the same rectangular shape as each other, and have the same size as each other as the sheets.

Of the two unit sheets 31 and 33, the unit sheet 31 located close to the light guide plate 52 is an optical sheet that diffuses the light received from the light source 51 via the light guide plate 52 and that directs the light toward the light receiving surface of the unit sheet 32. The unit sheet 32 is an optical sheet that collects the light received from the unit sheet 31 and that directs the light toward the light receiving surface of the unit sheet 33. The light transmitted through the unit sheet 32 enters into the unit sheet 33 from the light receiving surface thereof along a direction perpendicular to the unit sheet 32.

The unit sheet 33 located close to the liquid crystal display panel 1 is an optical sheet that further diffuses the light received from the diffusion sheet 32 such that the light has a more uniform luminance distribution, and that directs the light toward the other surface of the liquid crystal display panel 1. Hereinafter, the unit sheets 31 and 33 and the unit sheet 32 may also be referred to collectively as the optical sheet 3 for the sake of convenience.

As described above, the optical sheet 3 is arranged to face the light output surface of the light guide plate 52, and includes the plurality of unit sheets 31, 32 and 33 provided in a stacked state. The unit sheets 31, 32 and 33 each have a thin sheet shape having sheet surfaces opposite to each other (light receiving surface and light directing surface) as main surfaces. The light directing surface of the unit sheet 31 and the light receiving surface of the unit sheet 32 are arranged to face each other, and the light directing surface of the unit sheet 32 and the light receiving surface of the unit sheet 33 are arranged to face each other. In this manner, these three sheets are stacked. The surface, of the unit sheet 31 close to the light guide plate 52, that faces the light output surface of the light guide plate 52 (namely, the light receiving surface of the unit sheet 31) is the light receiving surface of the optical sheet 3. The surface, of the unit sheet 33 closest to the liquid crystal display panel 1, that faces the light receiving surface of the liquid crystal display panel 1 (namely, the light directing surface of the unit sheet 33) is the light directing surface of the optical sheet 3.

Figure 4:
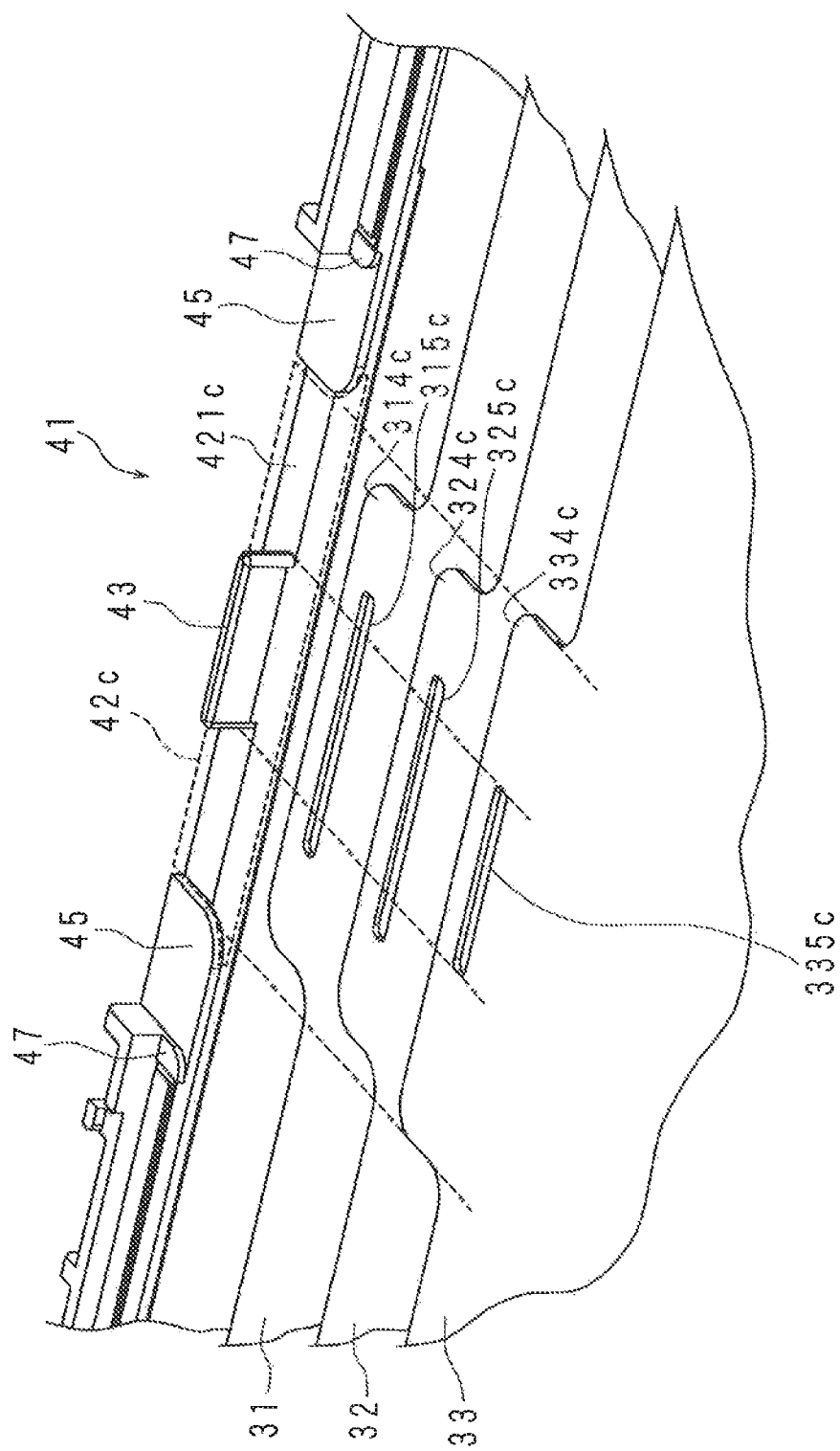
FIG. 4 is a perspective view illustrating a structure of the optical sheet and a holding frame member in the liquid crystal TV receiver in embodiment 1.
Figure 5:
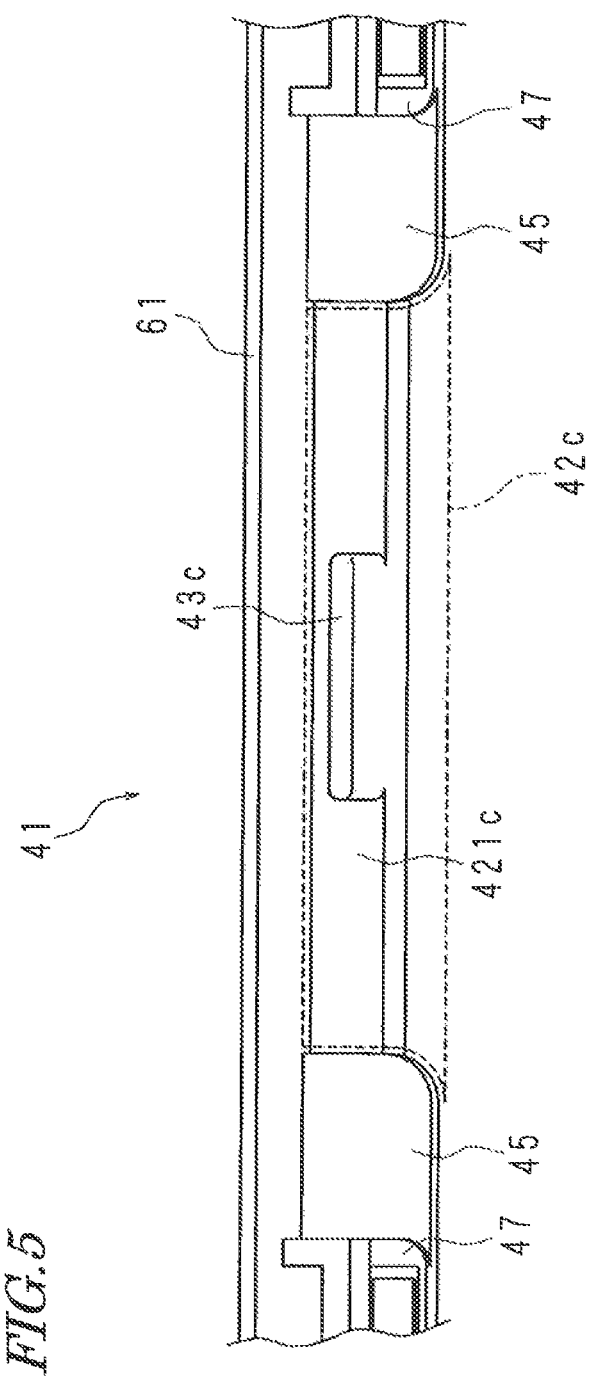
FIG. 5 is a partial perspective view illustrating the holding frame member in the liquid crystal TV receiver in embodiment 1.

FIG. 4 is a perspective view illustrating a structure of the optical sheet 3 and the holding frame member 4 in the liquid crystal TV receiver 100 in embodiment 1. FIG. 5 is a partial perspective view illustrating the holding frame member 4 in the liquid crystal TV receiver 100 in embodiment 1.

As shown in FIG. 2, at an end side, of each of the rectangular unit sheets 31, 32 and 33, that is closest to an end surface of the light guide plate 52 far from the light input surface of the light guide plate 52 (closest to the surface opposite to the light input surface of the light guide plate 52) (such an end side will be referred to as a "specific end side" or "one longer side"), engageable flanges (flanges) extend outward from the unit sheet along the sheet plane of the unit sheet. More specifically, the unit sheets 31, 32 and 33 each have three engageable flanges (flanges) along the one longer side far from the light source 51.

In more detail, the diffusion sheet 31 includes engageable flanges 314a, 314b and 314c provided in this order at an equal interval and extending from a side edge of the one longer side along the sheet plane of the diffusion sheet 31. The diffusion sheet 33 includes engageable flanges 334a, 334b and 334c provided in this order at an equal interval and extending from a side edge of the one longer side along the sheet plane of the diffusion sheet 33. The prism sheet 32 includes engageable flanges 324a, 324b and 324c provided in this order at an equal interval and extending from a side edge of the one longer side along the sheet plane of the prism sheet 32. Hereinafter, the engageable flanges 314a, 314b and 314c will also be referred to simply as "engageable flange 314". The engageable flanges 334a, 334b and 334c will also be referred to simply as "engageable flange 334". The engageable flanges 324a, 324b and 324c will also be referred to simply as "engageable flange 324".

The engageable flanges 314, 324 and 334 are used for engagement of the holding frame member 4 and the optical sheet 3. The engageable flanges 314, 324 and 334 are rectangular, and each have an engageable hole to engage with the holding frame member 4 formed therein.

In more detail, the engageable flanges 314a, 314b and 314c respectively have engageable holes 315a, 315b and 315c formed therein. The engageable flanges 324a, 324b and 324c respectively have engageable holes 325a, 325b and 325c formed therein. The engageable flanges 334a, 334b and 334c respectively have engageable holes 335a, 335b and 335c formed therein.

Hereinafter, for the sake of convenience, the engageable holes 315a, 315b and 315c will also be referred as "engageable holes 315", the engageable holes 325a, 325b and 325c will also be referred as "engageable holes 325", and the engageable holes 335a, 335b and 335c will also be referred as "engageable holes 335".

The engageable holes 315, 325 and 335 are through-holes respectively running through the engageable flanges 314, 324 and 334 extending from the specific end sides (the one longer sides) along the sheet planes of the unit sheets 31, 32 and 33 included in the optical sheet 3. The engageable holes 315, 325 and 335 respectively run through the engageable flanges 314, 324 and 334 in a direction perpendicular to the sheet planes. It is preferred that such an engageable hole has an opening having a shape longer in a direction of the one longer side of the unit sheet (elliptical shape, oval shape, rectangular shape or the like).

Among the engageable holes 315a, 315b and 315c, the engageable hole 315a is smaller in size than each of the engageable holes 315b and 315c. Among the engageable holes 325a, 325b and 325c, the engageable hole 325b is smaller in size than each of the engageable holes 325a and 325c. Among the engageable holes 335a, 335b and 335c, the engageable hole 335c is smaller in size than each of the enqageable holes 335a and 335b. The engageable holes 315a, 325b and 335c have the same size as each other.

Hereinafter, for the sake of convenience, the engageable flanges 314, 324 and 334 will also be referred to as "engageable flange 34", and the engageable holes 315, 325 and 335 will also be referred to as "engageable hole 35".

The engageable flange 314b, the engageable flange 324b and the engageable flange 334b are respectively provided at a center, of the unit sheets included in the optical sheet 3, in a direction along the one longer side (hereinafter, referred to as a "one longer side direction"). In the one longer side direction, the engageable flanges 314a and 314c are provided on both sides of the engageable flange 314b, the engageable flanges 324a and 324c are provided on both sides of the engageable flange 324b, and the engageable flanges 334a and 334c are provided on both sides of the engageable flange 334b.

The holding frame member 4 holding the optical sheet 3 such that the optical sheet 3 faces the liquid crystal display panel 1 is located to the rear of the optical sheet 3.

The holding frame member 4 is a frame body that includes a holding frame 41 including four surfaces surrounding the end sides of the optical sheet 3 and having a rectangular opening defined by the four surfaces. The holding frame member 4 holds the liquid crystal display panel 1 by the four surfaces. The holding frame 41 is in contact with the edges of the optical sheet 3, and an outermost outer surface of the holding frame 41 is in contact with a side wall 61 of the back chassis 6. The opening of the holding frame 41 is smaller in size than the one surface of the light guide plate 52.

Accommodation portions 42a, 42b and 42c each accommodating the engageable flanges 314, 324 and 334 are formed in a facing portion, of the holding frame 41, facing the one longer side of the optical sheet 3. Namely, the accommodation portion 42a corresponding to the engageable flanges 314a, 324a and 334a, the accommodation portion 42b corresponding to the engageable flanges 314b, 324b and 334b, and the accommodation portion 42c corresponding to the engageable flanges 314c, 324c and 334c are formed in the facing portion of the holding frame 41.

In this manner, in the holding frame member 4, such a plurality of accommodation portions accommodating the above-described plurality of engageable flanges in the state where the holding frame member 4 holds the optical sheet 3 are formed.

FIG. 4 and FIG. 5 show the accommodation portion 42c as an example. Hereinafter, the accommodation portions 42a, 42b and 42c will be described by way of the accommodation portion 42c as an example.

The accommodation portion 42c is a recessed portion provided in the facing portion of the holding frame 41 along the one longer side direction. The accommodation portion 42c has a contact surface 421c, which is in contact with a part of the engageable flange 314c (part extending from the light receiving surface) at a bottom surface of the recessed portion. The accommodation portion 42c is formed by shaving a part of the facing portion, more specifically, a part of a front surface of the facing portion that faces the optical sheet 3. An engageable protrusion. 43c is provided at a center, in the one longer side direction, of the accommodation portion 42c. In more detail, the engageable protrusion 43c protruding forward is formed on the bottom surface of the recessed portion. An engageable protrusion 43a and an engageable protrusion 43b (not shown) are also provided respectively in the accommodation portions 42a and 42b. Hereinafter, the engageable protrusions 43a, 43b and 43c will also be referred to simply as "engageable protrusion 43" for the sake of convenience.

The engageable protrusion 43c provided in the accommodation portion 42c is inserted into the engageable holes 315c, 325c and 335c, so that the engageable protrusion 43c is put into engagement with the engageable holes 315c, 325c and 335c. As a result, the unit sheet 33 is held by the holding frame member 4. Namely, one of the four surfaces surrounding the optical sheet 3 holds the optical sheet 3. The same is applicable to the unit sheets 31 and 32, and detailed descriptions will be omitted.

In the facing portion of the holding frame 41, both of two ends, in the one longer side direction, of the accommodation portion 42c are used as guide portions 45 guiding the accommodation of the engageable flanges 314c, 324c and 334c. Specifically, an outer edge of each of the guide portions 45 defines a part of an outer edge of the accommodation portion 42c and smoothly guides the engageable flanges 314c, 324c and 334c into the accommodation portion 42c such that the engageable flanges 314c, 324c and 334c are accommodated in the accommodation portion 42c.

Namely, the accommodation portion 42c is demarcated by the contact surface 421c and the guide portions 45. In other words, the accommodation portion 42c is a recessed portion defined by the contact surface 421c and end surfaces of the guide portions 45 (represented by the dashed line in the figure). The engageable flanges 314c, 324c and 334c are accommodated in the accommodation portion 42c accommodation portion 42b accommodating the engageable flanges 314b, 324b and 334b, and the accommodation portion 42a accommodating the engageable flanges 314a, 324a and 334a, are also recessed portions (not shown) defined in substantially the same manner as the accommodation portion 42c.

Alternatively, the accommodation portions may each be formed by the guide portions and the engageable protrusion being coupled with plane corresponding to the contact surface.

Figure 6:
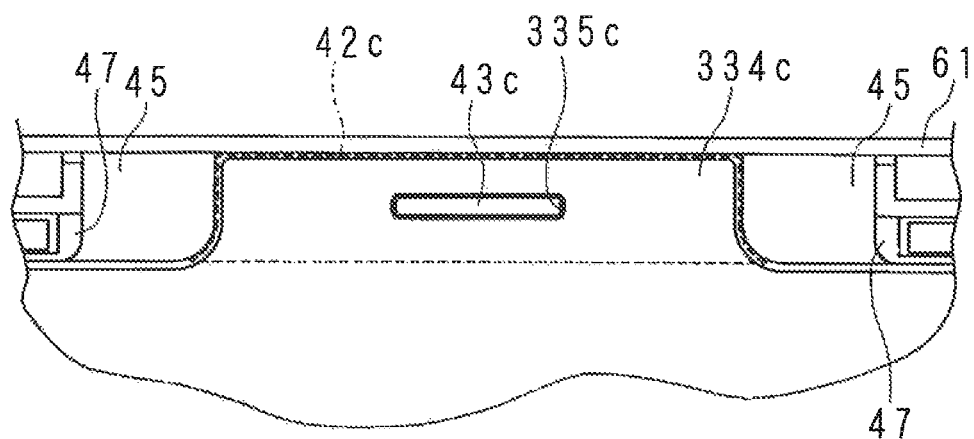
FIG. 6 is a view illustrating engagement of an engageable hole and an enqageable protrusion in the liquid crystal TV receiver in embodiment 1.
Figure 7:
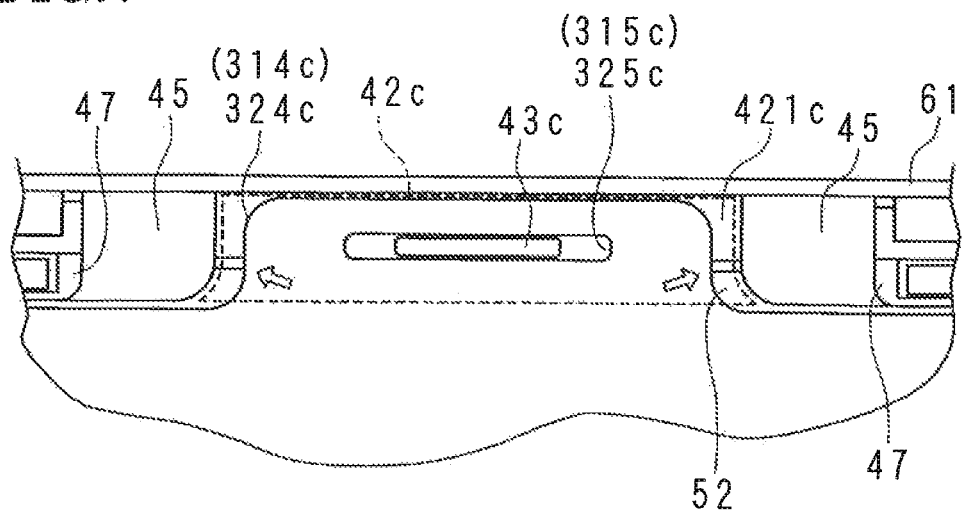
FIG. 7 is a view illustrating engagement of an engageable hole and the engageable protrusion in the liquid crystal TV receiver in embodiment 1.

FIG. 6 is a view illustrating engagement of the engageable hole 335c and the engageable protrusion 43c in the liquid crystal TV receiver 100 in embodiment 1. FIG. 7 is a view illustrating engagement of the engageable holes 315c and 325c and the engageable protrusion 43c in the liquid crystal TV receiver 100 in embodiment 1.

As shown in FIG. 6, the engageable flange 334c has a shape conforming to a shape of the accommodation portion 42c, and is matched to the shape of the accommodation portion 42c along the sheet plane of the unit sheet 3. In more detail, in the sheet plane of the unit sheet 33, the shape of the engageable flange 334c is matched to the shape of the accommodation portion 42c, and the engageable flange 334c and the accommodation portion 42c have the same size as each other. Therefore, in the case where the engageable hole 335c in the engageable flange 334c and the engageable protrusion 43c are engaged with each other, the engageable flange 334c covers the accommodation portion 42c with no gap.

In addition, as described above, the engageable hole 335c of the engageable flange 334c is smaller in size than each of the engageable holes 315c and 325c. The shape of the engageable hole 335c along the sheet plane of the unit sheet is matched to a shape of the engageable protrusion 43c along the sheet plane of the unit sheet 33. In more detail, in the sheet plane of the unit sheet 33, the shape of the engageable hole 335c is matched to the shape of the engageable protrusion 43c, and the engageable hole 335c and the engageable protrusion 43c have the same size as each other. Therefore, in the case where the engageable hole 335c and the engageable protrusion 43c are engaged with each other, the engageable protrusion 43c is inserted into the engageable hole 335c with no gap. Such engagement of the engageable hole 335c and the engageable protrusion 43c causes the unit sheet 33 to be attached to, and positioned with respect to, the holding frame member 4.

On the other hand, as shown in FIG. 7, the engageable flanges 314c and 324c are each smaller in size than the accommodation portion 42c in the sheet plane of the unit sheet. Therefore, in the case where the engageable holes 315c and 325c are engaged with the engageable protrusion 43c, the entirety of the accommodation portion 42c is not covered with the engagement flange 314c or 324c. Namely, a gap is made between the engageable flanges 314c and 324c, and each of the guide portions 45 (see the white arrows in FIG. 7). When the engageable flange 314c and 324c are thermally expanded due to heat generated by the light source 51, the presence of the yap prevents the optical sheet 3 from bending or being wrinkled.

In the sheet plane of the unit sheet, the engageable holes 315c and 325c are each larger in size than the engageable hole 335c. Specifically, on the facing portion of the holding frame 41, the engageable holes 315c and 325c are each larger in size than the enqageable protrusion 43c in the one longer side direction. Therefore, in the case where the engageable protrusion 43c is inserted into the engageable holes 315c and 325c, a gap is made between the engageable holes 315c and 325c, and the engageable protrusion 43c. Therefore, when the engageable flange 314c and 324c are thermally expanded, the engageable protrusion 43c does not disturb the thermal expansion and prevents the optical sheet 3 from bending or being wrinkled.

In the above, the structure of the accommodation portion 42c is described. The engageable protrusion 43a and the engageable protrusion 43b are respectively provided in the accommodation portions 42a and 42b. These accommodation portions have substantially the same structure as that of the accommodation portion 42c, and detailed descriptions thereof will be omitted.

In the above, the engagement of the engageable holes 315c, 325c and 335c and the engageable protrusion 43c in the accommodation portion 42c is described. This embodiment is not limited to the above.

In the accommodation portion 42a, the engageable flanges 314a, 324a and 334a are accommodated. At the time of accommodation, the engageable holes 315a, 325a and 335a are put into engagement with the engageable protrusion. 43a.

In this case, among the engageable flanges 314a, 324a and 334a, the engageable flange 314a has a shape conforming to a shape of the accommodation portion 42a, and the shape of the engageable flange 314a is matched to the shape of the accommodation portion 42a along the sheet plane of the unit sheet 31. In more detail, in the sheet plane of the unit sheet 33, the shape of the engageable flange 314a is matched to the shape of the accommodation portion 42a, and the engageable flange 314a and the accommodation portion 42a have the same size as each other. Therefore, in the case where the engageable hole 315a in the engageable flange 314a is engaged with the engageable protrusion. 43a, the engageable flange 314a covers the accommodation portion 42a with no cap.

In addition, as described above, the engageable hole 315a in the engageable flange 314a is smaller in size than each of the engageable holes 325a and 335a. The shape of the engageable hole 315a along the sheet plane of the unit sheet 31 is matched to a shape of the engageable protrusion 43a along the sheet plane of the unit sheet 31. In more detail, in the sheet plane of the unit sheet 31, the shape of the engageable hole 315a is matched to the shape of the engageable protrusion 43a, and the engageable hole 315a and the engageable protrusion 43a have the same size as each other. Therefore, in the case where the engageable hole 315a is engaged with the engageable protrusion 43a, the engageable protrusion 43a is inserted into the engageable hole 315a with no gap. Such an engagement state causes the unit sheet 31 to be attached to, and positioned with respect to, the holding frame member 4.

By contrast, the engageable flanges 324a and 334a are each smaller in size than the accommodation portion 42a in the sheet plane of the unit sheet. Therefore, in the case where the engageable holes 325a and 335a are engaged with the engageable protrusion 43a, a gap is made between the engageable flanges 324a and 334a, and each of the guide portions 45.

In the sheet plane of the unit sheet, the engageable holes 325a and 335a are each larger in size than the engageable hole 315a. Specifically, on the facing portion of the holding frame 41, the engageable holes 325a and 335a are each larger in size than the engageable protrusion 43a in the one longer side direction. Therefore, in the case where the engageable protrusion 43a is inserted into the engageable holes 325a and 335a, a gap is made between the engageable holes 325a and 335a, and the engageable protrusion. 43a. Therefore, the engageable flanges 324a and 334a are allowed to be thermally expanded freely.

In the accommodation portion 42b, the engageable flanges 314b, 324b and 334b are accommodated. At the time of accommodation, the engageable holes 315b, 325b and 335b are put into engagement with the engageable protrusion 43b.

In this case, among the engageable flanges 314b, 324b and 334b, the engageable flange 324b has a conforming to a shape of the accommodation portion 42b, and the shape of the engageable flange 324b is matched to the shape of the accommodation portion 42b along the sheet plane of the unit sheet 32. In more detail, in the sheet plane of the unit sheet 31, the shape of the engageable flange 324b is matched to the shape of the accommodation portion 42b, and the engageable flange 324b and the accommodation portion 42b have the same size as each other. Therefore, in the case where the engageable hole 325b in the engageable flange 324b is engaged with the engageable protrusion 43b, the engageable flange 324b covers the accommodation portion 42b with no gap.

In addition, as described above, the engageable hole 325b in the engageable flange 324b is smaller in size than each of the engageable holes 315b and 335b. The shape of the engageable hole 325b along the sheet plane of the unit sheet 32 is matched to a shape of the engageable protrusion 43b along the sheet plane of the unit sheet 32. In more detail, in the sheet plane of the unit sheet 32, the shape of the engageable hole 325b is matched to the shape of the engageable protrusion 43b, and the engageable hole 325b and the engageable protrusion 43b have the same size as each other. Therefore, in the case where the engageable hole 325b is engaged with the engageable protrusion 43b, the engageable protrusion 43b is inserted into the engageable hole 325b with no gap. Such an engagement state causes the unit sheet 32 to be attached to, and positioned with respect to, the holding frame member 4.

By contrast, the engageable flanges 314b and 334b are each smaller in size than the accommodation portion 42b in the sheet plane of the unit sheet. Therefore, in the case where the engageable holes 315b and 335b are engaged with the engageable protrusion 43b, a gap is made between the engageable flanges 314b and 334b, and each of the guide portions 45.

In the sheet plane of the unit sheet, the engageable holes 315b and 335b are each larger in size than the engageable hole 325b. Specifically, on the facing portion of the holding frame 41, the engageable holes 315b and 335b are each larger in size than the engageable protrusion 43b in the one longer side direction. Therefore, in the case where the engageable protrusion 43b is inserted into the engageable holes 315b and 335b, a gap is made between the engageable holes 315b and 335b, and the engageable protrusion 43b. Therefore, the engageable flange 314b and 334b are allowed to be thermally expanded freely.

The holding frame member 4 includes support portions 47 supporting the liquid crystal display panel 1. The support portions 47 are strip-shaped and are each provided in the facing portion of the holding frame 41 as being continued from one end of the corresponding guide portion 45 in a direction of being distanced from the engageable protrusion 43c in the one longer side direction.

The light guide plate 52, which is rectangular, is located to the rear of the optical sheet 3 so as to face the optical sheet Namely, the one surface of the light guide plate 52 is arranged to face the other surface of the optical sheet 3. Light output from the light source 51 enters into the light guide plate 52 from the light input surface thereof and is guided, which is then directed toward the optical sheet 3 from the one surface.

The light guide plate 52 is formed of, for example, a transparent plate member (glass, acrylic resin, polycarbonate resin, etc.). In the case where point light sources such as LEDs or the like are used for the light source, the light guide plate 52 diffuses light from each of the point light sources to generate uniform planar light and directs the light from the one surface.

The reflective sheet 53 is, for example, rectangular, and is located such that one surface thereof faces the other surface of the light guide plate 52. The reflective sheet 53 returns the light leaking from the other surface of the light guide plate 52 back to the light guide plate 52.

The light source 51 is provided as being directed toward the light input surface of the light guide plate 52. The light source 51 includes, for example, a plurality of light emitting diodes (LEDs) 55 mounted on a substrate 54.

The optical sheet 3 is held by the holding frame member 4 so as to cover the opening of the holding frame 41 of the holding frame member 4. The unit sheet 31, the unit sheet 32 and the unit sheet 33 are attached to the holding frame 41 in this order.

Namely, in the state where the engageable flanges 34 of the optical sheet 3 are in contact with the contact surfaces 421 of the holding frame 41 of the holding frame member 4, the engageable holes 35 in the engageable flanges 34 of the optical sheet are put into engagement with the engageable protrusions 43. In this manner, the holding frame member 4 holds the optical sheet 3. In more detail, three engageable holes 315, 325 and 335 are in engagement with one engageable protrusion 43.

In the meantime, as described above, in each of the engageable flanges 34 other than the engageable flanges 314a, 324b and 334c (matching flanges), a gap is made between the engageable flanges 34 and each of the guide portions 45, in order to prevent thermal expansion of the optical sheet 3, caused by the heat generated by the light source 51, from causing any inconvenience.

Without the matching flanges 314a, 324b and 334c, there is an undesirable possibility that light from the light guide plate 52 leaks through the gap. A part of the light directed from the light guide plate 52 may directly reach the liquid crystal display panel 1, not received by the liquid crystal display panel 1 after being transmitted through the optical sheet 3. As a result, that may cause luminance unevenness or the like in the liquid crystal display panel 1.

Nonetheless, in the liquid crystal TV receiver 100 in embodiment 1, the shape of the engageable flanges 314a, 324b and 334c along the sheet plane is matched to the shape of the accommodation portions 42a, 42b and 42c, and the engageable flanges 314a, 324b and 334c and the accommodation portions 42a, 42b and 42c have the same size as each other. Therefore, the above-described problem is prevented. Hereinafter, this will be described in detail.

FIG. 8 provides views illustrating the relationship between the accommodation portion 42a and the engageable flanges 314a, 324a and 334a in the liquid crystal TV receiver 100 in embodiment 1. FIG. BA shows a state where the engageable flange 314a is accommodated in the accommodation portion. 42a. FIG. 8B shows a state where the engageable flange 324a is accommodated in the accommodation portion 42a. FIG. 8C snows a state where the engageable flange 334a is accommodated in the accommodation portion 42a.

In the accommodation portion 42a, the front surface of the engageable flange 314a is in contact with the rear surface of the engageable flange 324a, and the front surface of the engageable flange 324a is in contact with the rear surface of the engageable flange 334a.

As described above, along the sheet plane of the unit sheet 31, the shape of the engageable flange 314a is matched to the shape of the accommodation portion. 42a, and the engageable flange 314a and the accommodation portion 42a have the same size as each other. Therefore, in the case where the engageable flange 314a is accommodated in the accommodation portion 42a, the engageable flange 314a covers the accommodation portion. 42a with no gap.

In the sheet plane of the unit sheet, the engageable flanges 324a and 334a are smaller in size than the accommodation portion. 42a. In the case where the engageable flanges 324a and 334a are accommodated in the accommodation portion 42a, there is a gap between the engageable flanges 324a and 334a, and each of the guide portions 45.

Therefore, without the matching flange 314a, in the case where light from the light guide plate 52 reaches the accommodation portion 42a, there is an undesirable possibility that the light directly reaches the liquid crystal display panel 1 and as a result, luminance unevenness or the like is caused in the liquid crystal display panel 1.

However, as shown in FIG. 8A, the engageable flange 314a covers the accommodation portion 42a with no gap. Therefore, the light from the light guide plate 52 does not enter the liquid crystal display panel 1 without being transmitted through the engageable flange 314a, and such light is prevented from directly reaching the liquid crystal display panel 1.

In addition, when the engageable flange 314a is accommodated in the accommodation portion 42a, the engageable protrusion 43a is inserted into the engageable hole 315a in the engageable flange 314a with no gap. Therefore, the unit sheet 31 is attached to, and positioned with respect to, the holding frame member 4.

By contrast, when the engageable flanges 314b and 314c are accommodated in the accommodation portions 42b and 42c, the engageable protrusions 43b and 43c are respectively inserted into the engageable hole 315b in the engageable flange 314b and the engageable hole 315c in the engageable flange 314c. However, as described above, there are gaps between the engageable holes 315b and 315c and the engageable protrusions 43b and 43c.

Therefore, when being thermally expanded, the optical sheet 3 (unit sheet 31) expands in a direction of being distanced from the engageable flange 314a, namely, in a direction from the engageable flange 314a toward the engageable flanges 314b and 314c. However, there are caps between the engageable holes 315b and 315c and the engageable protrusions 43b and 43c. Therefore, the optical sheet 3 is allowed to expand freely in such a direction, and is prevented from bending or being wrinkled.

FIG. 9 provides views illustrating the relationship between the accommodation portion 42b and the engageable flanges 314b, 324b and 334b in the liquid crystal TV receiver 100 in embodiment 1. FIG. 9A shows a state where the engageable flange 314b is accommodated in the accommodation portion 42b. FIG. 9B shows a state where the engageable flange 324b is accommodated in the accommodation portion 42b. FIG. 9C shows a state where the enqageable flange 334b is accommodated in the accommodation portion 42b.

In the accommodation portion 42b, a front surface of the engageable flange 314b is in contact with a rear surface of the engageable flange 324b, and a front surface of the engageable flange 324b is in contact with a rear surface of the engageable flange 334b.

In the sheet plane of the unit sheet, the engageable flange 314b is smaller in size than the accommodation portion 42b. In the case where the engageable flange 314b is accommodated in the accommodation portion 42b, there is a gap between the engageable flange 314b and each of the guide portions 45.

Along the sheet plane of the unit sheet, the shape of the engageable flange 324b is matched to the shape of the accommodation portion 42b, and the engageable flange 324b and the accommodation portion 42b have the same size as each other. Therefore, in the case where the engageable flange 324b is accommodated in the accommodation portion 42b, the engageable flange 324b covers the accommodation portion 42b with no gap.

By contrast, in the sheet plane of the unit sheet, the engageable flange 334b is smaller in size than the accommodation portion 42b. In the case where the engageable flange 334b is accommodated in the accommodation portion 42b, there is a gap between the engageable flange 334b and each of the guide portions 45.

Based on the above, without the matching flange 324b, in the case where light from the light guide plate 52 reaches the accommodation portion 42b, there is an undesirable possibility that the light directly reaches the liquid crystal display panel 1 and as a result, luminance unevenness or the like is caused in the liquid crystal display panel 1.

However, as shown in FIG. 9B, the engageable flange 324b covers the accommodation portion 42b with no gap. Therefore, the light from the light guide plate 52 does not enter the liquid crystal display panel 1 without being transmitted through the engageable flange 324b, and thus is prevented from directly reaching the liquid crystal display panel 1.

In addition, in the case where the engageable flange 324b is accommodated in the accommodation portion 42b, the engageable protrusion 43b is inserted into the engageable hole 325b in the engageable flange 324b with no gap. Therefore, the unit sheet 32 is attached to, and positioned with respect to, the holding frame member 4.

By contrast, when the engageable flanges 324a and 324c are accommodated in the accommodation portions 42a and 42a, the engageable protrusions 43a and 43c are respectively inserted into the engageable hole 325a in the engageable flange 324a and the engageable hole 325c in the engageable flange 324c. However, as described above, there are gaps between the engageable holes 325b and 325c and the engageable protrusions 43a and 43c.

Therefore, when being thermally expanded, the optical sheet 3 (unit sheet 32) expands in a direction of being distanced from the engageable flange 324b, namely, in directions toward the engageable flanges 324a and 324c. However, there are gaps between the engageable holes 325a and 325c and the engageable protrusions 43a and 43c. Therefore, the optical sheet is allowed to expand freely in such directions, and is prevented from bending or being wrinkled.

FIG. 10 provides views illustrating the relationship between the accommodation portion 42c and the engageable flanges 314c, 324c and 334c in the liquid crystal TV receiver 100 in embodiment 1. FIG. 10A shows a state where the engageable flange 314c is accommodated in the accommodation portion 42c. FIG. 103 shows a state where the engageable flange 324c is accommodated in the accommodation portion 42c. FIG. 10C shows a state where the engageable flange 334c is accommodated in the accommodation portion 42c.

In the accommodation portion 42c, a front surface of the engageable flange 314c is in contact with a rear surface of the engageable flange 324c, and a front surface of the engageable flange 324c is in contact with a rear surface of the engageable flange 334c.

In the sheet plane of the unit sheet, the engageable flanges 314c and 324c are each smaller in size than the accommodation portion 42c. In the case where the engageable flanges 314c and 324c are accommodated in the accommodation portion. 42c, there is a gap between the engageable flanges 314c and 324c, and each of the guide portions 45.

Along the sheet plane of the unit sheet, the shape of the engageable flange 334c is matched to the shape of the accommodation portion 42c, and the engageable flange 334c and the accommodation portion 42c have the same size as each other. Therefore, in the case where the engageable flange 334c is accommodated in the accommodation portion 42c, the engageable flange 334c covers the accommodation portion 42c with no gap.

Based on the above, without the matching flange 334c, in the case where light from the light guide plate 52 reaches the accommodation portion 42c, there is an undesirable possibility that the light directly reaches the liquid crystal display panel 1 and as a result, luminance unevenness or the like is caused in the liquid crystal display panel 1.

However, as shown in FIG. 10C, the engageable flange 334c covers the accommodation portion 42c with no gap. Therefore, the light from the light guide plate 52 does not enter the liquid crystal display panel 1 without being transmitted through the engageable flange 334c, and thus is prevented from reaching the liquid crystal display panel 1.

In addition, in the case where the engageable flange 334c is accommodated in the accommodation portion 42c, the engageable protrusion 43c is inserted into the engageable hole 335c in the engageable flange 334c with no gap. Therefore, the unit sheet 33 is attached to, and positioned with respect to, the holding frame member 4.

By contrast, when the engageable flanges 334a and 334b are accommodated in the accommodation portions 42a and 42b, the engageable protrusions 43a and 43b are respectively inserted into the engageable hole 335a in the engageable flange 334a and the engageable hole 335b in the engageable flange 334b. However, as described above, there are gaps between the engageable holes 335a and 335b and the engageable protrusions 43a and 43b.

Therefore, when being thermally expanded, the optical sheet 3 (unit sheet 33) expands in a direction of being distanced from the engageable flange 334c, namely, in a direction from the engageable flange 334c toward the engageable flanges 334b and 334c. However, there are gaps between the engageable holes 335a and 335b and the engageable protrusions 43a and 43b. Therefore, the optical sheet 3 is allowed to expand freely in such a direction, and is prevented from bending or being wrinkled.

In summary, as shown in FIG. 8, in the unit sheet 31, the engageable flange 314a, which is one of the plurality of flanges, is the matching flange having a shape matched to the shape of one (42a) of the accommodation portions included in the holding frame member 4, along the sheet plane of the unit sheet 31. As shown in FIG. 9, in the unit sheet 32, the engageable flange 324b, which is one of the plurality of flanges, is the matching flange having a shape matched to the shape of one (42b) of the accommodation portions included in the holding frame member 4, along the sheet plane of the unit sheet is shown in FIG. 10, in the unit sheet 33, the engageable flange 334c, which is one of the plurality of flanges, is the matching flange having a shape matched to the shape of one (42c) of the accommodation portions included in the holding frame member 4, along the sheet plane of the unit sheet 33. In the state where the liquid crystal TV receiver 100 in this embodiment is assembled, in each of all of the accommodation portions included in the holding frame member 4, at least one matching flange is accommodated. In FIG. 8 through FIG. 10, the matching flange 314a and the engageable flanges 324a and 334a are accommodated in the accommodation portion 42a, the matching flange 324b and the engageable flanges 314a and 334c are accommodated in the accommodation portion. 42b, and the matching flange 334c and the engageable flanges 314c and 324c are accommodated in the accommodation portion 42c.

As described above, in the liquid crystal TV receiver 100 in embodiment 1, the light from the light guide plate 52 is prevented from directly reaching the liquid crystal display panel 1 via the accommodation portions 41a, 42b and 42c. As a result, luminance unevenness or the like is prevented from being caused in the liquid crystal display panel 1.

As described above, in this embodiment, it is considered to be sufficient that at least one of the plurality of flanges extending from each unit sheet is the matching flange having a shape matched to the shape of the corresponding accommodation portion in the sheet plane, and that at least one of the matching flanges included in the optical sheet is accommodated in each of the accommodation portions. It is preferred that the flanges and the accommodation portions are in engagement with each other in the state where the flanges are accommodated, and that components required for the engagement are formed in both of the flanges and the accommodation portions. In this embodiment, it is preferred that an engageable protrusion engageable with the engageable hole (through-hole) formed in each of the flanges is formed in each of the accommodation portions. It is more preferred that the engageable hole of each matching flange has a cross-sectional shape, in a direction along the sheet plane, matched to the shape of the corresponding engageable protrusion in the same plane.

In this embodiment, the plurality of flanges may extend from a specific end side of each rectangular unit sheet. In the case where the plurality of flanges all have the same length in the direction in which the plurality of flanges extend, it is preferred that the matching flange has a longest length in a direction along the end side among lengths of the plurality of flanges in the direction along the end side. It is more preferred that an engageable hole formed in the matching flange has a smallest area size among area sizes of the engageable holes formed in the plurality of flanges extending from the unit sheet.

From the point of view of thermal expansion, in the case where the coefficients of thermal expansion of the plurality of unit sheets in this embodiment are compared, it is preferred that a first matching flange extending from a unit sheet having a larger coefficient of thermal expansion is formed farther from both of two ends of the specific end side, and that a second matching flange extending from a unit sheet having a smaller coefficient of thermal expansion is formed closer to one of the two ends of the specific end side.

More preferably, in an optical sheet including a plurality of rectangular unit sheets, the first matching flange is formed in the unit sheet having the largest coefficient of thermal expansion among the plurality of unit sheets, at a position farthest from both of the two ends of the specific end side from which the flanges extend (i.e., in the vicinity of the center of the end side), and the second matching flange is formed in the unit sheet having the smallest coefficient of thermal expansion among the plurality of unit sheets, at a position closest to one of the two ends of the specific end side (i.e., in the vicinity of one of the two ends of the end side).

In the above, the structure in which the matching flanges (engageable flanges 314a, 324b and 334c) in the unit sheets 31, 32 and 33 are respectively accommodated in the accommodation portions 42a, 42b and 42c is described. The present invention is not limited to this. For example, in the case where the number of the unit sheets is 3 or greater and the number of the accommodation portions is equal to the number of the unit sheets, a unit sheet, among the unit sheets, having a larger coefficient of expansion may be structured such that the matching flange thereof is accommodated in an accommodation portion, among the accommodation portions, closer to the center of the optical sheet 3 in the one longer side direction.

The present invention is not limited to this, and the number of the accommodation portions may be smaller than the number of the unit sheets.

Embodiment 2

In a liquid crystal TV receiver 100 in embodiment 2, the engageable flanges 314a, 324b and 334c each include a light-blocking film. Hereinafter, this will be described in detail by way of the engageable flange 334c as an example.

Figure 11:
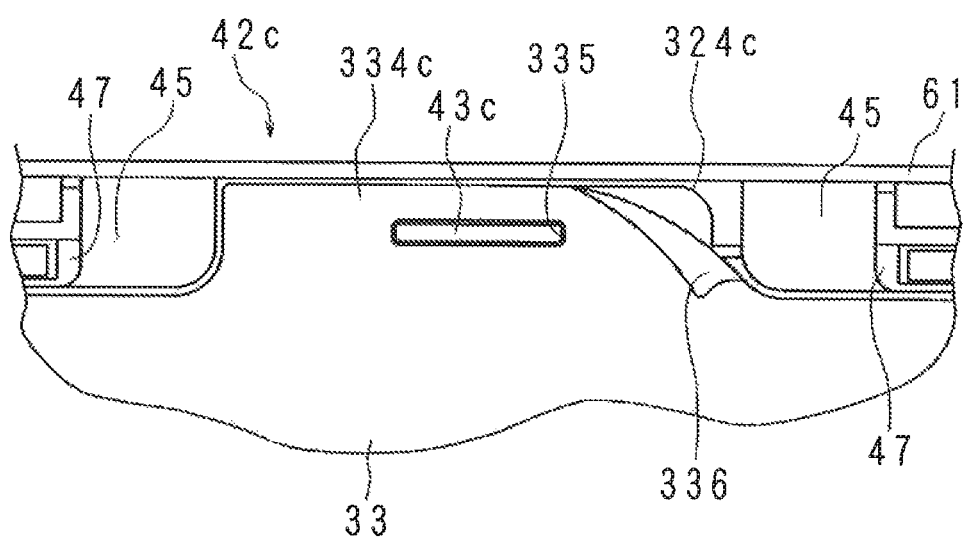
FIG. 11 is a view illustrating structures of engageable flanges in a liquid crystal TV receiver in embodiment 2.

FIG. 11 is a view illustrating a structure of the engageable flange 334c in the liquid crystal TV receiver 100 in embodiment 2.

In the liquid crystal TV receiver 100 in embodiment 2, the engageable flange 334c includes a light-blocking film. In more detail, the rear surface of the engageable flange 334c, which is in contact with the front surface of the engageable flange 324c in a state where the engageable flange 334c and the engageable flange 324c are accommodated in the accommodation portion 42c, is coated with a light-blocking film 336, which blocks light.

Therefore, even if light directed from the light guide plate 52 passes through a gap between the engageable flanges 314c and 324c and each of the guide portions 45, the light is prevented by the light-blocking film 336 from propagating toward the liquid crystal display panel 1.

Namely, the engageable flange 334c covers the gap between the engageable flanges 314c and 324c and each of the guide portions 45, and therefore, the light from the light guide plate 52 does not leak through the gaps. In addition, the light-blocking film 336 blocks the propagation of the light toward the liquid crystal display panel 1. Therefore, luminance unevenness or the like is prevented more reliably from being caused in the liquid crystal display panel 1.

In the above, a case where the light-blocking film is provided on the other surface of the engageable flange 334c is described as an example. The present invention is not limited to this. The light-blocking film 336 may be provided on one surface of the engageable flange 334c, the one surface facing the liquid crystal display panel 1.

In the above, a case where the engageable flange 334c includes the light-blocking film is described as an example. The present invention is not limited to this. For example, the engageable flange 334c may include a reflective film that reflects the light from the light guide plate 52.

Namely, in this embodiment, it is considered to be sufficient that the liquid crystal TV receiver 100 has a structure in which the matching flange includes a light-blocking film on a surface thereof directed toward the light guide plate, in addition to the structure described in embodiment 1.

In the above, a case where the engageable flange 334c includes the light-blocking film is described as an example for the sake of convenience. The engageable flanges 314a and 324b each also include a light-blocking film. The structure of the engageable flanges 314a and 324b is same as that of the engageable flange 334c and thus will not be described in detail.

Components substantially the same as those in embodiment 1 bear the same reference signs thereto, and detailed descriptions thereof will be omitted.

In the above, a case where the optical sheet 3 includes three unit sheets is described as an example. The present invention is not limited to this, and such a structure may be modified when necessary.

In the above, a case where the liquid crystal TV receiver 100 includes a so-called edge-lit light source device is described as an example. The present invention is not limited to this. The light source device may be of a direct-lit type.

REFERENCE SIGNS LIST 1 liquid crystal display panel
3 optical sheet
4 holding frame member
31, 32, 33 unit sheet
34 holding flange
42 accommodation portion
52 light guide plate
100 liquid crystal TV receiver
315, 325, 335 engageable hole
314a, 324b, 334c matching flange
336 light-blocking film

The invention claimed is:

1. A display apparatus, comprising:
a light guide plate having a light output surface;
an optical sheet including a plurality of unit sheets provided in a stacked manner, the plurality of unit sheets each including a plurality of flanges extending outward from a side edge of the unit sheet along a sheet plane of the unit sheet, the optical sheet facing the light output surface; and
a holding frame member including a plurality of accommodation portions formed therein, the plurality of accommodation portions accommodating the flanges included in the optical sheet in a state where the holding frame member holds the optical sheet,
wherein at least one of the plurality of flanges of each of the plurality of unit sheets is a matching flange having a shape matched to a shape of the corresponding accommodation portion along the sheet plane,
wherein, in each of the accommodation portions, at least one of the matching portions included in the optical sheet is accommodated,
wherein each of the flanges has a through-hole formed therein, the through-hole running through the flange,
wherein an engageable protrusion to engage with the through-hole is formed in each of the accommodation portions,
wherein the through-hole in the matching flange has a cross-sectional shape along the sheet plane, matched to a cross-sectional shape of the engageable protrusion along the sheet plane,
wherein the plurality of unit sheets are rectangular,
wherein the plurality of flanges extend from a specific end side of each of the unit sheets,
wherein in the case where the plurality of flanges all have the same length in a direction in which the plurality of flanges extend, the matching flange has a longest length in a direction along the specific end side among lengths of the plurality of flanges in the direction along the specific end side,
wherein a number of the plurality of flanges of each of the plurality of unit sheets is equal to a number of the plurality of accommodation portions,
wherein at least one of the plurality of flanges of each of the plurality of unit sheets is an unmatching flange having a shape smaller than the corresponding accommodation portion along the sheet plane, and
wherein in each of the plurality of accommodation portions, one of the matching portions included in the plurality of unit sheets and at least one of the unmatching portions included in the plurality of unit sheets are accommodated.

2. The display apparatus of claim 1, wherein a shape of the through-hole in the matching flange has a smallest area size along the sheet plane among area sizes of the through-holes formed in the plurality of flanges.

3. The display apparatus of claim 1, wherein a first matching flange extending from a unit sheet having a larger coefficient of thermal expansion, among coefficients of thermal expansion of the plurality of unit sheets, is formed farther from both of two ends of the specific end side, and a second matching flange extending from a unit sheet having a smaller coefficient of thermal expansion, among coefficients of thermal expansion of the plurality of unit sheets, is formed closer to one of the two ends of the specific end side.

4. The display apparatus claim 1, further including a light-blocking film on a surface of the matching flange, the surface being close to the light guide plate.

* * * * *